Figure 1:
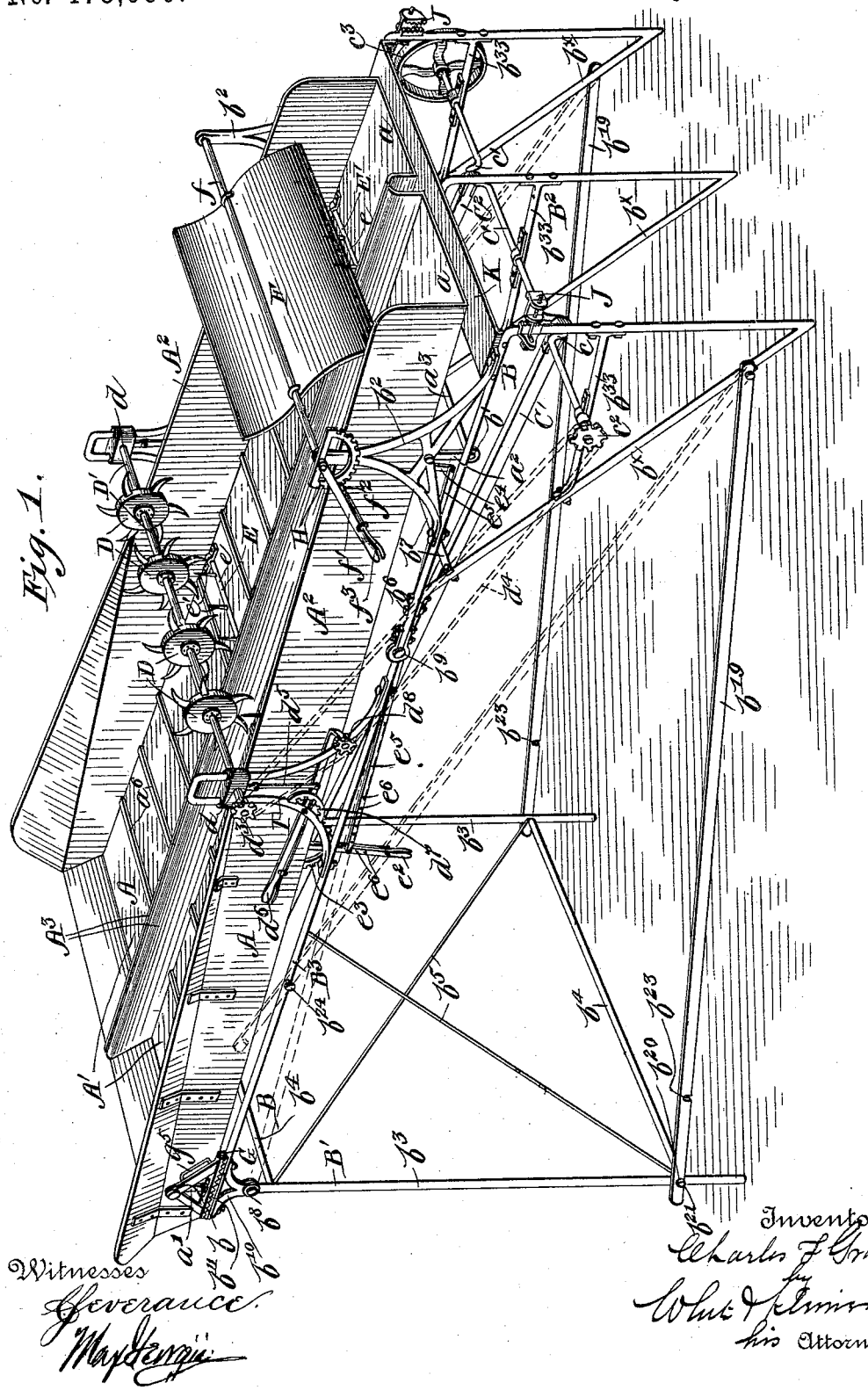

(No Model.) 3 Sheets—Sheet 2.

C. F. GRAHAM.
BAND CUTTER AND FEEDER FOR THRASHING MACHINES.

No. 478,996. Patented July 19, 1892.

Witnesses
Severance
Marterge

Inventor
Charles F. Graham
by White & Kleiner
his Attorneys (No Model.) 3 Sheets—Sheet 3.
C. F. GRAHAM.
BAND CUTTER AND FEEDER FOR THRASHING MACHINES.
No. 478,996. Patented July 19, 1892.
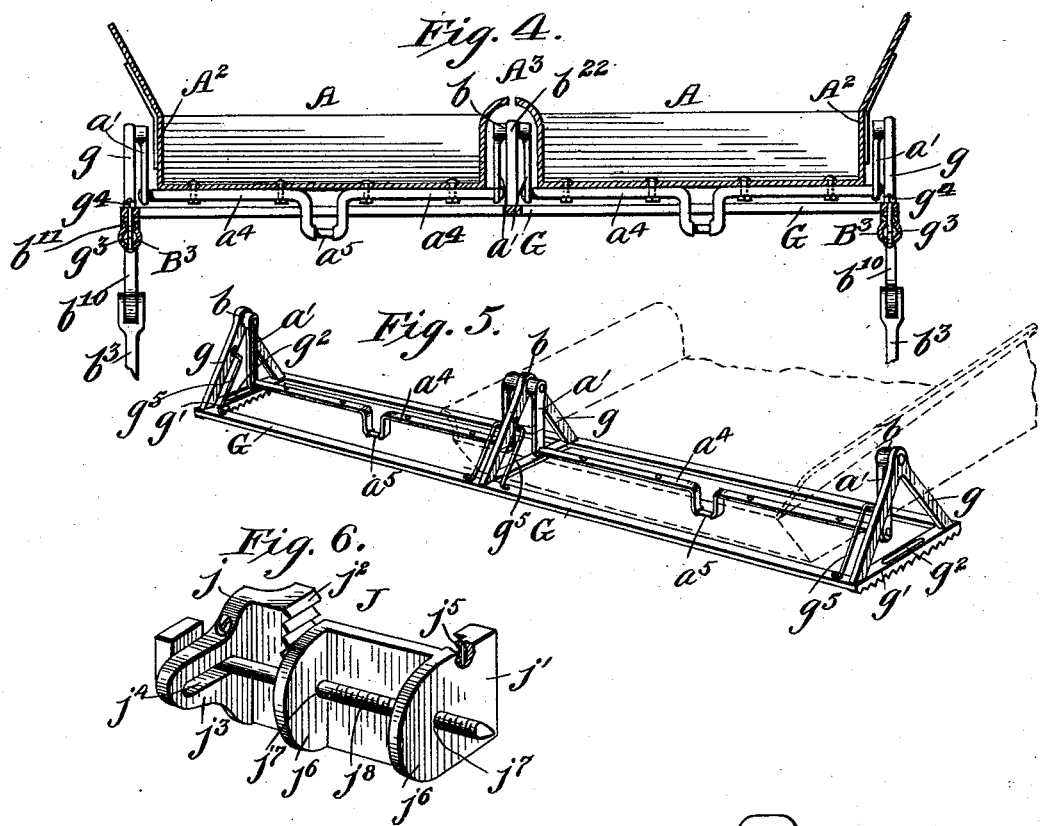
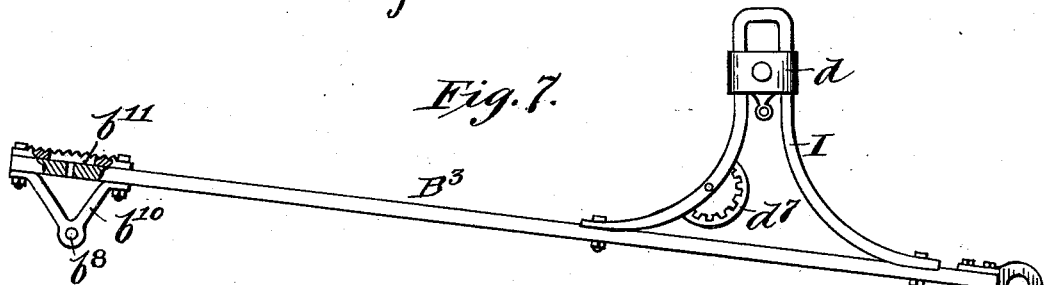
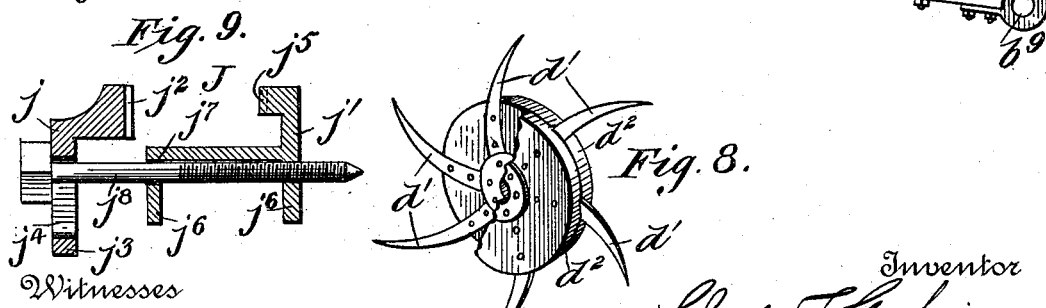

UNITED STATES PATENT OFFICE.

CHARLES F. GRAHAM, OF LUDLOW, ILLINOIS.

BAND-CUTTER AND FEEDER FOR THRASHING-MACHINES.

SPECIFICATION forming part of Letters Patent No. 478,996, dated July 19, 1892.

Application filed October 24, 1891. Serial No. 409,643. (No model.)

*To all whom it may concern:*

Be it known that I, CHARLES F. GRAHAM, a citizen of the United States, residing at Ludlow, in the county of Champaign and State of Illinois, have invented certain new and useful Improvements in Band-Cutters and Feeders for Thrashing-Machines; and I do hereby declare the following to be a full, clear, and exact description of the invention, such as will enable others skilled in the art to which it appertains to make and use the same.

The object of my invention is to provide a feeder which will be simple in operation and construction, whose parts are readily adjusted to suit the various requirements attending its use, and which will not be liable to become deranged or inoperative. For this purpose the machine embodying my invention in its general construction comprises a frame, preferably an open-work light metallic frame, which may be made in part of gas-pipe; two forwardly-inclined troughs arranged side by side and so suspended from the frame and connected with suitable mechanism as to be reciprocated longitudinally in opposite directions; cutters which may be raised or lowered with relation to the troughs, and separating teeth or spreaders, together with a sheet-iron gate which may be inclined more or less with respect to the troughs for the proper regulation of the feed of the grain to the thrasher or separator. Besides these my invention involves various other features, details of construction, and combination of parts, which will be fully set forth below, and covered in the claims.

In the drawings accompanying this specification I have shown a band-cutter and feeder, which I consider the best embodiment of my invention.

Figure 2:
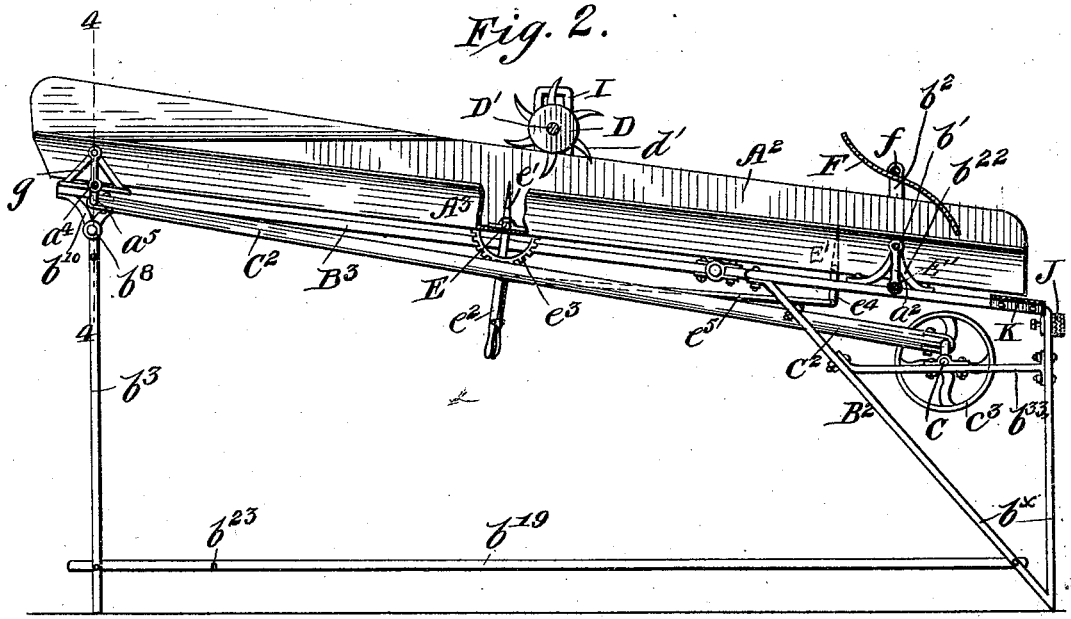
Figure 3:
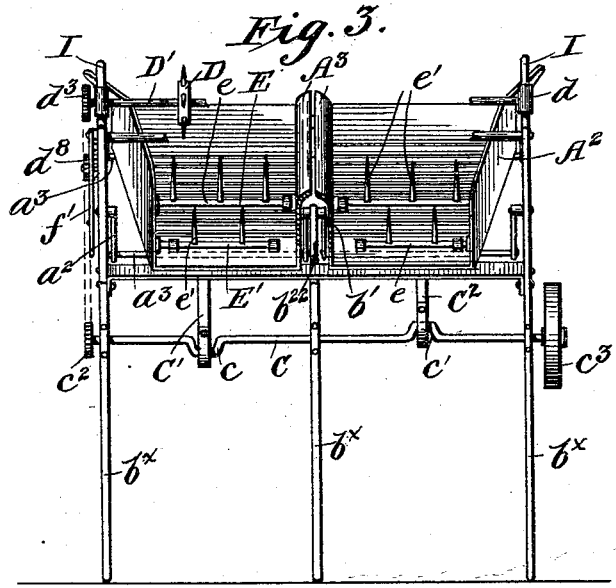

Figure 1 represents a perspective view; Fig. 2, a vertical longitudinal section, and Fig. 3 an end view of the same; Fig. 4, a vertical transverse section on an enlarged scale on line 4 4, Fig. 2; Fig. 5, a detail view in perspective, showing the mode of supporting the swinging troughs; Fig. 6, an enlarged detail view in perspective of the clamp for connecting the feeder to the thrasher or separator; Figs. 7, 8, and 9, detail views to be hereinafter referred to.

In the several figures the same parts are always designated by the same characters of reference.

It will be observed that the machine illustrated in the drawings consists, essentially, of two troughs A A, arranged side by side and adapted to swing or receive a jiggering motion and inclined toward the forward or discharging ends $a\ a$. For imparting the jiggering movement to the troughs I preferably suspend them from the frame B at the front and rear at the points $b$ and $b'$ by means of links $a'\ a^2$, which are pivoted in the frame B at the said points $b$ and $b'$ and to the cross-bars $a^3\ a^4$, which support the troughs and are preferably bolted or otherwise secured thereto, as best shown in Fig. 5. The swinging or jiggering motion is preferably imparted by means of a crank-rod C, whose cranks $c$ and $c'$ preferably extend in opposite directions, as shown, and pitmen $C'\ C^2$, connected at one end to the cranks and at the other to loops $a^5\ a^5$ on the cross-bars $a^3\ a^4$, or they may be connected to the troughs A A' in any other suitable and desired way. In connection with these swing-troughs I may employ rotary band-cutting knives D D, &c., mounted on a shaft D', supported in bearings $d$ in the frame B, and adapted to be raised and lowered by means to be hereinafter described. I also employ two spreaders E E' in each trough, the former located substantially below the band-cutters D D, &c., and the latter near the forward end of the machine. These spreaders consist, essentially, of transverse bars $e$, having teeth $e'$ projecting upwardly into the trough, whose function is to tear apart and spread the grain after the band-cutters have cut the bands and opened the sheaves. By means hereinafter to be set forth these spreaders can be adjusted so that the teeth will stand up straight or assume an inclined position or lie flat in the bottoms of the troughs. I also preferably employ a gate F, extending across the two troughs and preferably consisting of a sheet of metal bent into an $f$ shape and mounted on a transverse shaft or spindle $f$, mounted in standards $b^2$ at the forward end of frame B. This gate, whose function it is to control and regulate the feed of the grain to the separator, is adapted to be turned to occupy various angles with respect to the troughs by means to be described below.

I will now describe the various parts of the machine more in detail.

The frame B is a light open metal frame constructed so as to combine great strength with lightness and so as to be folded down for transportation and to be readily taken apart when required. For this purpose it consists, first, of a rear frame B', composed of the legs $b^3$ $b^3$, formed, preferably, of gas-pipe, and connected in any suitable manner by the cross-rods $b^4$ $b^4$, also preferably of gas-pipe, and the diagonal cross-rods $b^5$; second, a front frame $B^2$, preferably composed of the three triangular frames $b^\times$ $b^\times$ $b^\times$, formed of gas-pipe or similar material bent up, as shown, connected by bolts $b^6$ or otherwise near the ends, the three triangular frames being connected by a transverse connecting bar or rod $b^7$, bolted or otherwise secured thereto, as shown; third, intermediate connecting-rods $B^3$, one at each side of the machine and united to the rear and front frame by hinged connections $b^8$ $b^9$, as shown.

The rear ends of the connecting-rods $B^3$ are provided with the depending brackets $b^{10}$ and the upper toothed plates $b^{11}$, the brackets and toothed plates being bolted or otherwise secured together to the ends of the rods. The lower ends of the depending brackets $b^{10}$ are provided with eyes, as shown in Fig. 7, through which eyes the pivots of the hinges $b^8$ pass, as shown. Upon the toothed plates $b^{11}$ is mounted, so as to be adjusted longitudinally of the machine and fixed in its various positions of adjustment, the frame G, (best shown in Fig. 5,) which frame carries the three brackets or uprights $g$, provided at its ends with plates $g'$, having toothed or serrated surfaces corresponding to the toothed surfaces of the plates $b^{11}$ and having slots $g^2$, through which a bolt $g^3$ extending up from the plate $b^{11}$ and bracket $b^{10}$, passes. The said bolt is provided at its upper end with a nut $g^4$, as shown, which serves to secure the parts together. It will be seen by this arrangement I can adjust the brackets or uprights $g$ to any desired position on the end of rod $B^3$ and then secure the same in position. From the pivoted points $b$ of these brackets $g$ depend the four links $a'$, hereinbefore described, by which the rear ends of the troughs are suspended. These frames G, which, besides constituting a support for the troughs, also serve to give rigidity to the machine-frame, are provided with the four guide-rods $g^5$, arranged parallel to the uprights $g$, as shown, and serving to prevent lateral motion of the troughs.

The supports for the forward ends of the troughs consist in outer brackets or standards $b^2$ $b^2$ and a central bracket $b^{22}$, bolted to the triangular frames $b^\times$, as shown, from whose pivoted points or eyes $b'$ depend the trough-supporting links $a^2$, hereinbefore referred to. The outer standards $b^2$, moreover, form the supports or bearings for the shaft $f$ of the grate F, as hereinbefore stated, one of the standards having the notched segment H fixed thereto, while the shaft $f$ has secured to it a lever $f'$, provided with a sliding spring-dog $f^2$ for engaging with the notches in the notched segment and adapted to be released from the notches by a bell-crank lever $f^3$, pivoted on the lever $f'$ in the usual manner. It will be seen that by this arrangement I may adjust the sheet-metal gate F to any desired inclination and secure it in such position. The triangular frames $b^\times$ are, moreover, provided with the cross-rods $b^{33}$, provided with bearings, in which the crank-shaft C is journaled.

The troughs, (best shown in Figs. 1, 3, and 5,) as well as the upper part of the frame B, are downwardly inclined toward the discharging portion. They are, moreover, wider at their feeding than at their discharging ends for obvious reasons. They consist, essentially, of the bottoms A', preferably provided with transverse slats $a^6$ and outer and inner sides $A^2$ $A^3$. The outer sides or side boards are considerably higher than the inner ones, and I have found it to be practicable to make the outer sides $A^2$ twelve inches and the inner ones $A^3$ five inches high. The inner sides $A^3$ are, moreover, bent over toward each other, as shown, so as to cover up the space occupied by the central brackets $b^{22}$ and $g$ and the central links $a'$ $a^2$, supporting the troughs, and to prevent the grain from falling through into the space between the troughs.

In the bottom of each of the troughs are pivoted the spreaders E E', hereinbefore referred to. For the purpose of adjusting the inclination of both spreaders simultaneously I secure a handle $e^2$, provided with a spring-pawl, to spreader E and combine therewith a notched segment $e^3$ in the same manner as the lever and segment $f$ and H for adjusting the gate F. I moreover connect this handle $e^2$ with a downwardly-extending arm $e^4$, secured to the forward spreader E' by a link $e^5$, the link $e^5$ or the handle $e^2$, or both of them, being preferably provided with a series of perforations $e^6$, so that they may be united at various points to adjust the inclination of the spreaders E E' with relation to each other.

The band-cutting knives D D preferably consist of curved blades $d'$, held between disks $d^2$ $d^2$ of any suitably material, the said disks being bolted or otherwise secured together, as shown in Fig. 9, the bolts preferably passing through the blades $d'$. As before stated, these band-cutting knives are mounted on shaft D, supported in bearings $d$. These bearings are adapted to slide up and down in the standards I, bolted or otherwise secured to the connecting-rods $B^3$. The standards I preferably are made of gas-pipe or metal rods bent up into the desired shape, and the bearings $d$ are made to encircle the upper vertical portions of the standards, as shown. The shaft D' is provided at one end with a sprocket-wheel $d^3$, which is geared with a sprocket-wheel $c^2$ on the crank-shaft C by a chain $d^4$, whereby the band-cutters and troughs are operated from the same source of power, which may be applied to the crank-shaft C through the pulley $c^3$, keyed to the said crank-shaft. To raise and lower the bearings $d$, the same are connected by links $d^5$ to levers $d^6$, pivoted to the standards and having movable dogs engaging with notched segments $d^7$, secured to the standards, the levers and segments being constructed and operating similarly to the segments and levers for adjusting the spreaders E E' and the gate F, as will be readily understood by reference to the drawings. The arm or lever $d^6$ at the side where the chain $d^4$ is located, moreover, extends beyond the segment $d^7$ and is provided at its end with a belt-tightener in the shape of a sprocket-wheel $d^8$, which serves to compensate for the slack in the chain caused by lowering the bearings $d$, and hence serves to keep said chain taut for all positions the bearings $d$ may occupy.

The rear frame B' is held in position by connecting-rods $b^{19}$, pivoted to the outer triangular frames $b^x$ and provided at their ends with notches $b^{20}$ for engaging headed pins $b^{21}$ or the like. They are also provided with intermediate notches $b^{23}$, which serve to engage similar pins $b^{24}$ on the connecting-rods $B^3$ when the frame is folded up for transportation, as indicated in dotted lines in Fig. 1.

For the purpose of connecting the band-cutter and feeder to the thrasher and separator I provide clamps J. (Shown enlarged in detail in Fig. 6.) Each of these clamps consists of a piece or angle-iron $j$, adapted to be bolted to the outer or forward upright portions of the triangular frames $b^x$ and forming one jaw of the clamp, and the piece or angle-iron $j'$, forming the other jaw. The piece $j'$ comprises the serrated portion $j^2$ or clamp proper and the transverse tongue $j^3$, provided with a slot $j^4$. The piece $j'$ is provided with the serrated edge $j^5$, constituting the other jaw of the clamp, and the flanges $j^6 \ j^6$, arranged on the opposite side of the piece $j'$ and provided with threaded eyes $j^7 \ j^7$. A screw $j^8$ connects the two pieces $j$ and $j'$ by passing through the slot $j^4$ and being threaded into the eyes $j^7$. The slot $j^4$ is for the purpose of allowing the jaw $j^5$ to clear the frame of the thrasher when the same is to be connected to the feeder. When the legs or other part of the thrasher-frame are in their proper position, the jaw $j^5$ is returned to the original position by virtue of the slot, and by turning the screw $j^8$ the jaws $j' \ j'$ are drawn together, as will be readily understood.

For the purpose of preventing the waste of grain and littering by dropping through between the feeder and the separator during the jiggering action of the troughs A A, I provide an apron or sheet-metal strip K, extending across the end of the machine and lapping under the troughs, as shown. This apron, which may extend a little beyond the end of the machine, is preferably bolted or otherwise secured to the outer triangular frames $b^x$, as shown, thus serving the additional purpose of bracing the rear frame of the machine.

The operation of the feeder and band-cutter is obvious from and has in parts been already described in the foregoing.

The sheaves of grain are deposited upon the rear ends of the converging troughs and downwardly-inclined troughs A A, and are fed downward by the jiggering action imparted to them by the crank-shaft C and pitmen C' $C^2$. When they arrive under the rotary cutters, which are caused to revolve by the chain $d^4$, connecting the crank-shaft C with the cutter-shaft D' by the intermediate connection described, the spreaders E serve to retain the sheaves temporarily, while the band-cutters sever the bands when the spreaders, in conjunction with the jiggering motion of the troughs, serve to evenly distribute the grain in said troughs, which action is further assisted by the spreaders E' and the gate F. According to the quality of the grain, the spreaders are raised or lowered more or less by the handle $e^2$. Generally for wet grain they are raised and for dry grain lowered.

It is manifest that the machine above described as embodying my invention may be modified in many particulars without departing from the spirit of my invention, and I do not, therefore, desire to be limited to the exact details herein shown; but

What I claim, and desire to secure by Letters Patent, is—

1. In a feeder, the combination, with a trough, of two spreaders consisting of two transverse rods pivoted in the bottom of the trough, provided with teeth extending into the trough, an adjusting-lever attached to the one spreader, a link for connecting the lever with the other spreader, and means for holding the adjusting-lever in its positions of adjustment, substantially as set forth.

2. In a feeder, the combination of the following parts: a series of band-cutters mounted on a rotary shaft, provided with a sprocket-wheel, vertically-movable bearings for the shaft, a crank-shaft for swinging the feed-troughs, provided with a sprocket-wheel, a chain connecting the two sprocket-wheels, and an adjusting-lever for raising and lowering the movable bearings of the band-cutter shaft, the said lever being provided with a belt-tightener, substantially as shown and described.

3. In a feeder, as a means for supporting the rear end of the trough or troughs, a main frame provided with serrated upper surfaces, in combination with a trough-supporting transverse frame having serrated lower surfaces at its outer ends to engage with the serrated surfaces of the main frame, and means for securing the said trough-supporting frame to the main frame, substantially as shown and described.

4. In a feeder, as a means for supporting the rear end of the trough or troughs, a main frame provided with serrated upper surfaces, in combination with a transverse trough-supporting frame provided with a slotted plate having lower serrated surfaces, and bolts for securing the two together, said bolts passing through the main frame and into the slots of the slotted plates, substantially as shown and described.

5. In a feeder, a transverse frame for supporting the troughs, consisting of a horizontal rectangular frame provided with serrated and slotted end plates, in combination with standards rising from the rectangular frame, and depending links pivoted in eyes in the standards, substantially as shown and described.

6. In a feeder, two troughs arranged side by side provided with outer walls and inner walls bent over toward each other so as to meet in a longitudinal line, in combination with three standards rising from the supporting-frame, the inner standards being arranged within the space between the inner bent-over walls of the troughs, cross-bars attached to the bottoms of the troughs, and links pivoted to the three standards and to the said cross-bars, substantially as shown and described.

7. In a feeder, a supporting-frame consisting of the rear rectangular frame, as B', the forward triangular frames $b^5$, connected together, and connecting-rods, as $B^3$, hinged to the rear frame and the outer triangular frames, substantially as shown and described.

8. In a feeder, the combination, with the supporting-frame, of clamps attached thereto, each clamp consisting of an angle-iron, as $j$, a jaw, as $j'$, and means to force the two together and adapted to secure the feeder to the separator, substantially as shown and described.

9. In a feeder, the combination, with the supporting-frame, of a clamp secured thereto, said clamp consisting of an angle-iron, as $j$, provided with a jaw or clamping portion and a slotted tongue, as $j^3$, in combination with a movable jaw, as $j'$, having a clamping-screw threaded thereinto and adapted to engage with the slotted tongue $j^3$, substantially as set forth.

In testimony whereof I affix my signature in presence of two witnesses.

CHARLES F. GRAHAM.

Witnesses:
C. M. SANGER,
R. A. McCRACKEN.